United States Patent [19]

Donate et al.

[11] Patent Number: 5,013,364
[45] Date of Patent: May 7, 1991

[54] STABILIZED 1,1,1-TRICHLOROETHANE

[75] Inventors: Felipe A. Donate, Midland; James G. Papajesk, Bay City, both of Mich.

[73] Assignee: The Dow Chemical Company, Midland, Mich.

[21] Appl. No.: 431,273

[22] Filed: Nov. 3, 1989

[51] Int. Cl.$^5$ .................. C08K 5/04; C09K 15/06; C11D 7/50
[52] U.S. Cl. ................. 106/311; 106/287.24; 252/170; 252/171; 134/38; 134/40
[58] Field of Search ............. 106/287.24, 311; 252/170, 171; 134/38, 40

[56] References Cited

U.S. PATENT DOCUMENTS

| | | |
|---|---|---|
| T889,002 | 8/1971 | Blankenship et al. ....... 260/652.5 R |
| 2,964,572 | 12/1960 | Miller et al. .................. 260/651 |
| 3,002,028 | 9/1961 | Haefner ....................... 260/652.5 |
| 3,074,890 | 1/1963 | Grammer ...................... 252/171 |
| 3,361,833 | 1/1968 | Blodgett ....................... 260/652.5 |
| 3,505,415 | 4/1970 | Richtzenhain et al. ........ 252/171 |
| 3,609,091 | 9/1971 | Harden .......................... 252/171 |
| 3,873,631 | 3/1975 | Beckers et al. .............. 260/652.5 R |
| 3,926,831 | 12/1975 | Sonnengrüber ................ 252/171 |
| 3,933,517 | 1/1976 | Vivian ........................... 106/311 |
| 3,933,518 | 1/1976 | Vivian ........................... 106/311 |
| 4,056,403 | 11/1977 | Cramer et al. ................ 134/22 R |
| 4,065,323 | 12/1977 | Cormany ....................... 134/10 |
| 4,189,397 | 2/1980 | Allen ............................. 252/171 |
| 4,326,924 | 4/1982 | Cummings ..................... 203/6 |

*Primary Examiner*—Theodore Morris
*Assistant Examiner*—Mary C. DiNunzio

[57] ABSTRACT

A solvent, 1,1,1-trichloroethane, is stabilized against corrosion by the addition of 2-acetoacetoxyalkyl methacrylate. A painting formulation is prepared using the stabilized solvent.

10 Claims, No Drawings

STABILIZED 1,1,1-TRICHLOROETHANE

BACKGROUND OF THE INVENTION

The present invention relates to stabilized 1,1,1-trichloroethane compositions.

The use of 1,1,1-trichloroethane as a solvent with applications in dry cleaning, industrial cleaning and degreasing operations is well-known. It is also known to use 1,1,1-trichloroethane as a solvent in adhesive, coating and ink formulations. The tendency of 1,1,1-trichloroethane to degrade in the presence of metals, particularly aluminum, and moisture is also recognized. Thus, it has long been customary to add stabilizing amounts of inhibitors to 1,1,1-trichloroethane to stabilize it against metal-induced decomposition and to prevent corrosive attack upon the metal surfaces in contact with it.

Numerous examples exist of inhibitor compositions which have been taught to be useful in the stabilization of 1,1,1-trichloroethane. U.S. Pat. No. 3,113,154 teaches that 1,1,1-trichloroethane is stabilized by a mixture of dioxolane, an amine and a mono-olefin. U.S. Pat. No. 3,397,148 teaches that 1,1,1-trichloroethane is stabilized against metal corrosion with dioxolane and an epoxide. U.S. Pat. No. 4,018,837 teaches that a mixture of (1) a monoepoxide, a monochloroepoxide or mixture thereof and (2) a three-component mixture selected from dioxane, dioxolane, trioxane, tertiary butyl alcohol and a nitroalkane is useful to stabilize 1,1,1-trichloroethane. U.S. Pat. No. 4,115,461 teaches generally that 1,1,1-trichloroethane may be stabilized using a mixture comprising an epoxide, dioxolane, a nitroalkane and an alcohol. U.S. Pat. No. 4,189,397 teaches that 1,1,1-trichloroethane is stabilized with a low molecular weight polyalkylene glycol monoalkyl ether. U.S. Pat. No. 3,074,890 teaches that diethylene glycol dimethyl ether stabilizes 1,1,1-trichloroethane against decomposition when in contact with aluminum. U.S. Pat. No. 2,371,645 teaches that certain ethers inhibit the corrosion of chlorinated solvents used in various degreasing processes.

The known inhibited 1,1,1-trichloroethane formulations are not without problems. Generally, these formulations have been developed for use in vapor degreasing and cold metal cleaning operations. Thus, the formulations known may not be well adapted for use in coating and ink applications. Further, many of the accepted inhibitors have become unacceptable from an environmental and/or toxicological perspective. Thus, what is lacking and what is needed is an inhibited 1,1,1-trichloroethane composition well adapted for use in coatings and inks which is environmentally acceptable.

SUMMARY OF THE INVENTION

In one aspect, the present invention is such a composition comprising 1,1,1-trichloroethane containing a stabilizing amount of an ester corresponding to the formula

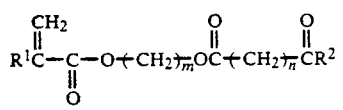

wherein $R^1$ is hydrogen, methyl or ethyl; m is from 2 to about 4; n is from 1 to about 6 and $R^2$ is methyl or ethyl.

In a second aspect, the present invention is a solvent-based paint formulation comprising from about 10 to about 90 volume percent 1,1,1-trichloroethane containing a stabilizing amount of the ester described above.

It is surprising that the inhibited 1,1,1-trichloroethane composition of this invention is stable to metal corrosion, particularly to aluminum corrosion, and does not contain inhibitor components that are known to be environmentally and toxicologically objectionable.

DETAILED DESCRIPTION OF ILLUSTRATIVE EMBODIMENTS

The esters useful in this invention are reactive inhibitors. By this it is meant that the esters of the present invention react when mixed into a coating formulation and are thus incorporated into the resin. It is preferred that at least about 50 percent of the ester reacts with the resin and is therefore not available to the atmosphere.

It is preferred that the inhibitors useful in the practice of this invention correspond to the formula

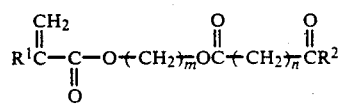

wherein $R^1$ is hydrogen, methyl or ethyl; m is from about 2 to about 4; n is from 1 to about 6 and $R^2$ is methyl or ethyl. It is preferred that $R^1$ is methyl, m is two, n is one and $R^2$ is methyl. Thus, a preferred inhibitor useful in this invention is 2-acetoacetoxyethyl methacrylate.

The compounds useful as inhibitors in this invention are available commercially.

The amount of substituted ester used to stabilize 1,1,1-trichloroethane is any which has a stabilizing effect. It is preferred to use at least about 0.5 weight percent and no greater than about 10.0 weight percent based on the total amount of solvent and inhibitor. It is more preferred to use at least about 3.5 and no greater than about 5.0 weight percent.

In addition to the stabilizer of this invention, the inhibited 1,1,1-trichloroethane composition of this invention may contain additional additives such as acid acceptors and metal passivators known in the art.

Acid acceptors useful in the practice of this invention include epoxidized natural oils such as epoxidized linseed oil or epoxidized soybean oil, preferably epoxidized linseed oil. Other useful acid acceptors include butylene oxide, isoamylene epoxide and substituted and unsubstituted $C_{3-6}$ monoepoxides such as epichlorohydrin. The amount of acid acceptors useful in this invention range from zero to about 1.0 weight percent with a preferred range being from about 0.05 to about 0.5 weight percent.

Metal passivators useful in the composition of this invention include nitroalkanes such as nitromethane, nitroethane and 1-nitropropane. Other metal passivators known in the art may also advantageously be used. It is preferred to use nitromethane as a metal passivator. The amount of metal passivators useful in this invention range from zero to about 1.0 weight percent with a preferred range being from about 0.05 to about 0.5 weight percent.

A preferred embodiment of the invention is the composition consisting essentially of from about 95.0 to about 96.5 weight percent 1,1,1-trichloroethane, about 3.5 to about 5.0 weight percent of 2-acetoacetoxyethyl methacrylate, about 0.05 weight percent butylene oxide and about 0.1 weight percent nitromethane.

The composition of the present invention is useful in formulation of low volatile organic-containing (VOC) coatings and inks. In a preferred embodiment, the invention comprises a solvent-based paint formulation comprising from about 10 to about 90 volume percent 1,1,1-trichloroethane containing a stabilizing amount of the substituted ester of this invention. It is preferred that the paint formulation comprise from about 40 to about 60 volume percent of the stabilized 1,1,1-trichloroethane.

The following examples are provided to illustrate the invention and should not be interpreted as limiting it in any way. Unless stated otherwise, all parts and percentages are by weight.

EXAMPLE 1

Aluminum Scratch Test

A 20-ml portion of 1,1,1-trichloroethane containing the percentage of the inhibitor identified in Table I below is placed in a 2-ounce Kerr jar containing a 1-inch by 1-inch by 1/16-inch coupon of 1100 aluminum. The coupon is scratched in a 3-line by 3-line cross hatch pattern using a steel septum tool. The coupon is observed at timed intervals initial, 5 minutes, 10 minutes, 15 minutes, 30 minutes and 1 hour. A numerical evaluation is given to each test one hour after scratching. The following ratings are used:

0 = complete inhibition
1 = light formation of reaction products on scratches
2 = medium formation of reaction products on scratches
3 = medium formation of reaction products on scratches; solution has slight yellow color
4 = heavy formation of reaction products on scratches; solution has yellow, amber or brown color
5 = runaway reaction within one hour The results obtained are shown in Table I below.

TABLE I

| Inhibitor [1] | Concentration (Wt. %) | Rating |
|---|---|---|
| None | — | 5.00 [1] |
| 2-Acetoacetoxyethyl Methacrylate | 4.00 | 0.00 |
| 2-Acetoacetoxyethyl Methacrylate | 3.00 | 1.00 |

[1] Not an example of the invention; vigorous reaction within 10 minutes.

The data in the above table indicates that the substituted methacrylates of the present invention are generally effective as aluminum corrosion inhibitors.

EXAMPLE 2

Blender Tests

A 100-ml portion of 1,1,1-trichloroethane containing the inhibitor at the concentration specified in Table II is placed in a Waring blender. Aliquots of the solution are analyzed by titration and gas chromatography to determine the weight percent of vinylidene chloride (VDC) and 1,1-dichloroethane and the milliequivalents per milliliter of chloride ion and hydrogen ion. This is reported in Table II below in the "Before" row. Next, 10.0 grams of 2024 aluminum shavings are added and then a glass plate is sealed on top of the blender using a high vacuum silicone grease. The blender is then started and operated at 15,500 revolutions per minute (rpm) for ten minutes or until the solution turns black and foams excessively. The blender is stopped after ten minutes and aliquots of the product solution are analyzed by titration and gas chromatography to determine the weight percent of vinylidene chloride (VDC) and 1,1-dichloroethane and the milliequivalents per milliliter of chloride ion and hydrogen ion. This is reported in Table II below in the "After" row. The data obtained is presented in Table II below.

TABLE II

| Inhibitor [1] | | VDC (Wt. %) | 1-1 Di (Wt. %) | $Cl^-$ (meq/ml) | $H^+$ (meq/ml) |
|---|---|---|---|---|---|
| 2-Acetoacetoxyethyl Methacrylate | Before | 0.026 | 0.000 | <0.00005 | 0.00292 |
| (4.0) | After | 0.032 | 0.011 | 0.00050 | 0.02397 |
| 2-Acetoacetoxyethyl Methacrylate | Before | 0.027 | 0.000 | <0.00005 | 0.00261 |
| (3.5) | After | 0.028 | 0.000 | 0.00335 | 0.01500 |
| 2-Acetoacetoxyethyl Methacrylate | Before | 0.018 | 0.000 | <0.00005 | 0.00222 |
| (3.0) | After | 0.519 | 0.108 | 0.04500 | 0.2900 |

The data presented in Table II demonstrates the effectiveness of the inhibitor compound of the present invention in the more stringent blender tests. In each instance, a comparison of the sample analysis before the blender test and after the test indicates only nominal increases in the amounts of breakdown products after the contact with aluminum shavings thus indicating the effectiveness of this invention in stabilizing 1,1,1-trichloroethane from aluminum corrosion. Generally, amounts greater than about 1 percent for VDC, greater than about 0.3 percent for 1,1-di, greater than about 0.2 milliequivalents per milliliter for each of $Cl^-$ and $H^+$ would indicate failure of the inhibitor.

EXAMPLE 3

A coating formulation is prepared using a stabilized solvent of this invention and commercially available paints. The paints used are a commercially available iron oxide alkyd primer and acrylic enamel topcoat. Two formulations are prepared. One uses CHLOROTHENE TM SM brand solvent which is an inhibited 1,1,1-trichloroethane solvent commercially available from The Dow Chemical Company. The second formulation uses 1,1,1-trichloroethane inhibited with 3.5 percent of 2-acetoacetoxyethyl methacrylate and 0.1 weight percent nitromethane. The formulations are prepared by diluting a commercial coating formulation with the inhibited solvent in a 1:1 volume ratio. The formulations are then tested for various properties and the results obtained are shown in Table III below.

TABLE III

| | CHLOROTHENE TM SM Solvent | Test Solvent |
|---|---|---|
| Film Thickness (mils) (Test Method D1186) | 3.33 | 4.29 |
| Paint Viscosity (Zahn No. 2 Cup) | 14.5 sec | 13.8 sec |
| Gloss (Test Method D523-80) | | |

TABLE III-continued

|  | CHLOROTHENE ™ SM Solvent | Test Solvent |
|---|---|---|
| 60° | 32.30 | 62.74 |
| 20° | 60.90 | 85.28 |
| Cross Hatch Adhesion (Test Method D3359) | 90% | 90% |
| Pencil Hardness (Test Method D3363) | H | 2H |
| Mandrel Bend (G10-77) | Failed | Failed |
| Reverse Impact | 1.5 pound | 1.5 pound |

As is demonstrated by the above information, coating formulations prepared using the inhibited solvents of the present invention result in coatings with comparable or improved properties when compared to a coating formulation using commercially available solvent.

What is claimed is:

1. A composition comprising 1,1,1-trichloroethane containing a stabilizing amount of a compound corresponding to the formula

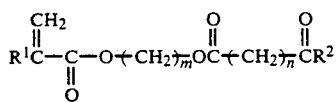

wherein $R^1$ is hydrogen, methyl or ethyl; m is from about 2 to about 4; n is from about 1 to about 6 and $R^2$ is methyl or ethyl.

2. The composition of claim 1 wherein the stabilizing compound is 2-acetoacetoxyalkyl methacrylate.

3. The composition of claim 1 further comprising a metal passivator and an acid acceptor.

4. The composition of claim 3 consisting essentially of from about 95.0 to about 96.5 weight percent 1,1,1-trichloroethane, about 3.5 to about 5.0 weight percent of 2-acetoacetoxyethyl methacrylate, about 0.05 weight percent acid acceptor and about 0.1 weight percent metal passivator.

5. The composition of claim 3 wherein the metal passivator is selected from the group consisting of nitromethane, nitroethane and nitropropane.

6. The composition of claim 3 wherein the acid acceptor is selected from the group consisting of epoxidized linseed oil, epoxidized soybean oil, butylene oxide, isoamylene epoxide, and substituted and unsubstituted $C_{3-6}$ monoepoxides.

7. The composition of claim 4 consisting essentially of abut 95.0 to about 96.5 weight percent 1,1,1-trichloroethane; about 3.5 to about 5.0 weight percent 2-acetoacetoxyethyl methacrylate; about 0.05 weight percent butylene oxide; and about 0.1 weight percent nitromethane.

8. A solvent-based paint formulation comprising from about 10 to about 90 volume percent 1,1,1-trichloroethane containing a stabilizing amount of a compound corresponding to the formula

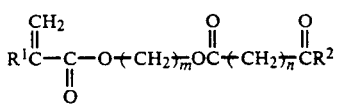

wherein $R^1$ is hydrogen, methyl or ethyl; m is from about 2 to about 4; n is from about 1 to about 6 and $R^2$ is methyl or ethyl.

9. The formulation of claim 8 wherein the stabilizing compound is 2-acetoacetoxyalkyl methacrylate.

10. The formulation of claim 9 wherein the stabilized 1,1,1-trichloroethane comprises from about 40 to about 60 percent of the formulation.

* * * * *